United States Patent [19]

Price

[11] 4,071,977
[45] Feb. 7, 1978

[54] AUTOMATIC SILO DOOR CONSTRUCTION

[75] Inventor: Raymond R. Price, Rochester, Minn.

[73] Assignee: Rochester Silo, Inc., Rochester, Minn.

[21] Appl. No.: 709,935

[22] Filed: July 29, 1976

[51] Int. Cl.[2] .................. E06B 7/00; B65G 65/34; E05C 15/00; E05F 1/10
[52] U.S. Cl. ..................... 49/70; 49/364; 49/379; 49/386; 214/17 DB
[58] Field of Search ............... 49/386, 379, 364, 141, 49/70; 214/17 DB; 302/56; 52/192–196

[56] References Cited

U.S. PATENT DOCUMENTS

| | | | |
|---|---|---|---|
| 952,876 | 3/1910 | Clark et al. | 52/193 X |
| 1,773,124 | 8/1930 | Sykes | 49/379 X |
| 1,842,998 | 1/1932 | Rebischke et al. | 49/364 X |
| 3,017,044 | 1/1962 | Englemann | 214/17 DB |
| 3,670,907 | 6/1972 | Downing | 214/17 DB |
| 3,709,345 | 1/1973 | Price | 52/196 X |
| 3,792,556 | 2/1974 | Anghinetti et al. | 49/379 X |
| 3,797,625 | 3/1974 | Price | 214/17 DB X |
| 3,851,908 | 12/1974 | Hester et al. | 49/379 X |

Primary Examiner—Philip C. Kannan

Attorney, Agent, or Firm—Williamson, Bains, Moore & Hansen

[57] ABSTRACT

Automatically actuable silo door apparatus and a silo equipped with same. The apparatus preferably comprises a door member adapted to selectively block a silage discharge orifice, a hinge assembly for mounting the door, retractable gun means for automatically activating the door apparatus, and trigger apparatus responsive to silage level for selectively activating the gun means to open the door. In a preferred form of the invention each trigger means comprises a portion received within an upper adjacent silo door orifice whereby an automatic silo unloader will contact and activate it during the unloading operation. The hinge means preferably comprises first and second spaced apart door hinge bars, each having portions pivotally mounted to the door member and integral offset portions thereof pivotally received by the silo. The hinge means enables the door member to be moved out of and away from the silo door orifice when opened to prevent interference with the unloader. A silo disclosed herein comprises a plurality of vertically spaced apart silo doors which may be automatically, sequentially opened to facilitate automatic silo unloading.

41 Claims, 11 Drawing Figures

AUTOMATIC SILO DOOR CONSTRUCTION

BACKGROUND OF THE INVENTION

This invention relates generally to the construction of silos and silo doors. More particularly, the instant invention relates to an automatically openable silo door and a silo equipped with a plurality of automatic doors.

Argricultural silos are used to store a wide variety of agricultural products. Silage stored therewithin may be inputted interiorly of the silo through an upper door in the roof, and when it is desired to remove this silage it may be discharged therefrom through a plurality of conventional, vertically spaced apart silo orifices disposed on one side of the silo. The orifices are typically covered with some form of door which may be moved between open and closed positions where desired to discharge silage.

A plurality of prior art silo door systems are known. U.S. Pat. Nos. 2,367,720, issued to M. Goldbeck, 2,341,763, issued Feb. 15, 1944, issued to Z. Craine, and 952,876, issued Mar. 22, 1910, all show silo doors mounted to silo orifices through hinges whereby the doors may be completely moved out of the discharge opening. U.S. Pat. No. 2,068,972, issued to Bangert on Jan. 26, 1937, discloses a silo door adapted to be pivotally moved out of and away from a door opening. U.S. Pat. Nos. 1,106,662, 1,203,397, issued to C. Perkins; 1,387,751, issued to V. Bauder, on Aug. 16, 1921; and 1,811,486, issued to S. Anderson, on June 23, 1931; all disclose silo doors adapted to be secured to silo discharge orifices. U.S. Pat. No. 2,931,599, issued Apr. 5, 1960, discloses a door adapted for use with a pressurized aircraft cabin.

Also relevant is U.S. Pat. No. 3,709,345, issued to the same assignee as in the present case. Therein are depicted silo doors which are adapted to pivot outwardly from the silo discharge orifices in which they are received when in a closed position. A co-pending U.S. Pat. application, Ser. No. 610,453, filed Sept. 4, 1975, assigned to the same assignee as in the instant case and issued on Dec. 14, 1976 as U.S. Pat. No. 3,997,025 is also relevant to the silo door art.

Prior art silo doors are adapted to be opened through a plurality of conventional, usually manually operable schemes. For example, it is known to secure a door manually through the use of a simple latch mechanism. Moreover, offset hinge means have been provided whereby the door may be secured within the silo discharge orifice when in a closed position, and moved completely out of the orifice and away from it during unloading of the silo. Where a silo is to be unloaded the farmer need merely manually open the vertically spaced apart doors along the side of the silo one at a time depending upon the position of the internally disposed, silo unloading apparatus. Usually a ladder structure must be climbed by the farmer to reach the silo doors in order to manually open them during the unloading process. Examples of this type of ladder construction are shown in the aforementioned co-pending application, Ser. No. 610,453, filed Sept. 4, 1975, Group Art Unit 353, and in the aforementioned U.S. Pat. No. 3,709,345.

At present it is known to unload silos through the use of internally disposed, rotatable silo unloaders which have an element which rotates within the silo to pick up silage for subsequent discharge through a guide member which communicates outwardly through the silo door orifice. Silos of this type include a revolvable member usually having an auger of some form therewithin which rest upon silage internally of the silo and revolve about a circular path thereby picking up and discharging silage and progressively becoming lowered in the silo during the process of unloading. Raw material picked up by the rotatable member is delivered to the center of the apparatus and blown through the discharge chute out of the silage discharge opening. Known prior art silage unloaders constructed generally in this fashion are disclosed in U.S. Pat. Nos. 2,963,327, issued Dec. 6, 1960; 3,002,790, issued Oct. 3, 1961, to G. Chapman, and 3,531,059, issued Nov. 10, 1970. When silo unloaders of the type described are employed internally of the silo, it is normally the job of the operator to sequentially open the silo discharge doors at an appropriate time. If, for example, the doors are all opened at once, silage stored at lower levels within the silo will spoil or escape in a haphazard manner. On the other hand, even if the silo doors are sequentially manually opened it is often disadvantageous for the operator to climb to the appropriate position or to otherwise manipulate the silo door.

SUMMARY OF THE INVENTION

The instant invention comprises an automatically openable silo door and a silo equipped with a plurality of automatic doors. The doors are adapted to be triggered by deflection of a trigger, which preferably will be contacted by the discharge chute of a conventional automatic rotatable silo unloader to facilitate sequential opening of the various silo doors.

To this effect the door apparatus preferably comprises a door slab adapted to be sealably received within a predefined silo discharge orifice, hinge means for mounting the slab to the silo, a retractable gun which, when activated, automatically forces the door out of and away from the discharge orifice to open same, and trigger means for activating the door means in response to mechanical contact. In a preferred embodiment the trigger means will include a portion thereof disposed within a upper, adjacent silo door orifice whereby the automatic silo unloader output chute will contact same during the unloading process to sequentially open the vertically arranged doors in an orderly, one-by-one fashion. The retractable gun means preferably comprises a pair of axially displaceable elements and spring means for biasing the elements in an axially outwardly extended position. The apparatus preferably includes gun hinge means whereby the gun will pivot somewhat with respect to the silo in response to activation thereof. With the gun hinge construction as disclosed, the retracted gun will pivot against the silo wall to urge the door in a closed, properly seated position within the predefined silo door orifice in which it is received. When desired to open the door, the trigger means is contacted to activate the gun means, thereby releasing energy stored in the gun spring and moving the axially displaceable gun elements into a fully extended position. In this manner the door slab will be simultaneously selectively pivoted away from and moved out of the silo discharge orifice to prevent deleterious contact with the silo unloader discharge apparatus normally subsequently occupying a portion of the discharge orifice.

A silo disclosed and claimed herein essentially comprises a plurality of automatically openable door members constructed as mentioned above. Therefore, in conjunction with a conventional prior art rotary silo unloader of the type mentioned and discussed earlier herein, the instant silo's vertically disposed doors automatically, sequentially open at an appropriate time to insure even and continuous automatic unloading operation. Of course, the silo door apparatus may be opened manually by the farmer by mechanically deflecting the trigger. In either case, where the silo unloading operation is completed, the doors may be manually closed by simply closing them against predetermined tension from the gun means spring until they abut and are received within the door orifice, at which time they are fastened to the gun trigger. When the silo is subsequently unloaded, the cocked guns will automatically reopen the doors in response to trigger actuation.

Therefore broad objects of this invention are to provide a silo door which will open automatically, and to provide a silo with automatically functioning silage discharge doors.

A similar important object is to provide a silo door which opens automatically in response to the silage level within the silo during the unloading process. Of course it is another object to provide a silo equipped with a plurality of doors characterized as above.

A still further object of this invention is to provide hinge apparatus for maintaining a silo door in a controlled orientation when moved between closed and open positions.

Another object of this invention is to provide a silo door adapted to be opened automatically and which in opening will move out of and away from the silo discharge orifice to prevent or minimize contact with conventional automatic silo unloaders. It is an important feature of this invention that the door slab is hingably mounted to the silo through a pair of spaced apart, offset hinge members which move the door to a safe, out-of-the-way location interiorly of the silo when in an open position.

Another object of this invention is to provide a silo door of the character described which may be opened by automatic silo unloaders. An important feature of this invention includes a trigger positioned to be contacted by conventional silo unloaders to facilitate automatic, sequential opening of the typically vertically spaced apart silo doors as the unloader moves downwardly within the silo during unloading.

Still another object of this invention is to provide a silo door construction of the character described which may be opened automatically and yet which will maintain a tight, weatherproof seal when in a closed position.

Another object of this invention is to provide a silo door of the character described which will open automatically with a minimum of operator adjustment and manipulation.

A still further object of this invention is to provide a silo door with an extremely reliable trigger system for facilitating automatic opening thereof. It is a feature of this invention that gun means employed to open the door is normally biased toward an axially fully extended position. Energy stored within the spring during the closing of the door may be subsequently released by a mechanical deflection of the trigger means to quickly and automatically force open the door during unloading.

A still further object of this invention is to provide a silo with a plurality of doors which may be opened automatically during the silage unloading process. It is a feature of the silo disclosed herein that the doors mounted thereon may be sequentially automatically opened as a conventional silo unloader disposed therewithin is employed.

Yet another object of this invention is to provide automatically openable silo door apparatus (and a silo equipped with same) with safety means for preventing inadvertent operation. In one form of this invention the trigger includes a portion adjacent an upper door hinge means, and the trigger cannot be activated until the upper door has previously been opened.

These and other objects and advantages of this invention, along with features of novelty apertenant thereto, will appear or become apparent in the course of the following description.

BRIEF DESCRIPTION OF THE DRAWINGS

In the following drawings, which form a part of the specification and are to be constructed in conjunction therewith, and in which like reference numerals have been employed throughout to indicate like parts in the various views.

DETAILED DESCRIPTION OF THE DRAWINGS

The silo door apparatus described herein is adapted to be mounted in a silo for selectively, automatically opening the silage discharge orifices normally provided therein. As will be recognized by those skilled in the art, a vertically upright silo 10 (FIG. 1) includes a plurality of generally rectangular, vertically spaced apart silage discharge orifices 11 through which an output chute of an internally disposed, automatic silo unloader will eject silage during the unloading process. Silo 10 includes a plurality of conventional stacked nodules 12 of tonque and groove construction which are secured by conventional reinforcement bands 14. An upwardly extending vertical discharge chute 15 is provided to enclose the silage discharge orifices 11 and to guide the discharged silage to a ground location conveniently accessible to the farmer. While it is contemplated that the silo 10 will be provided with an internally located silo unloader of the type previously discussed, it should be understood that the apparatus described herein will also function adequately either manually or with various other unloader systems. Silo 10 is provided with a plurality of automatically openable doors clearly depicted in the succeeding figures.

Figures 1, 2, 5, 6, 7:
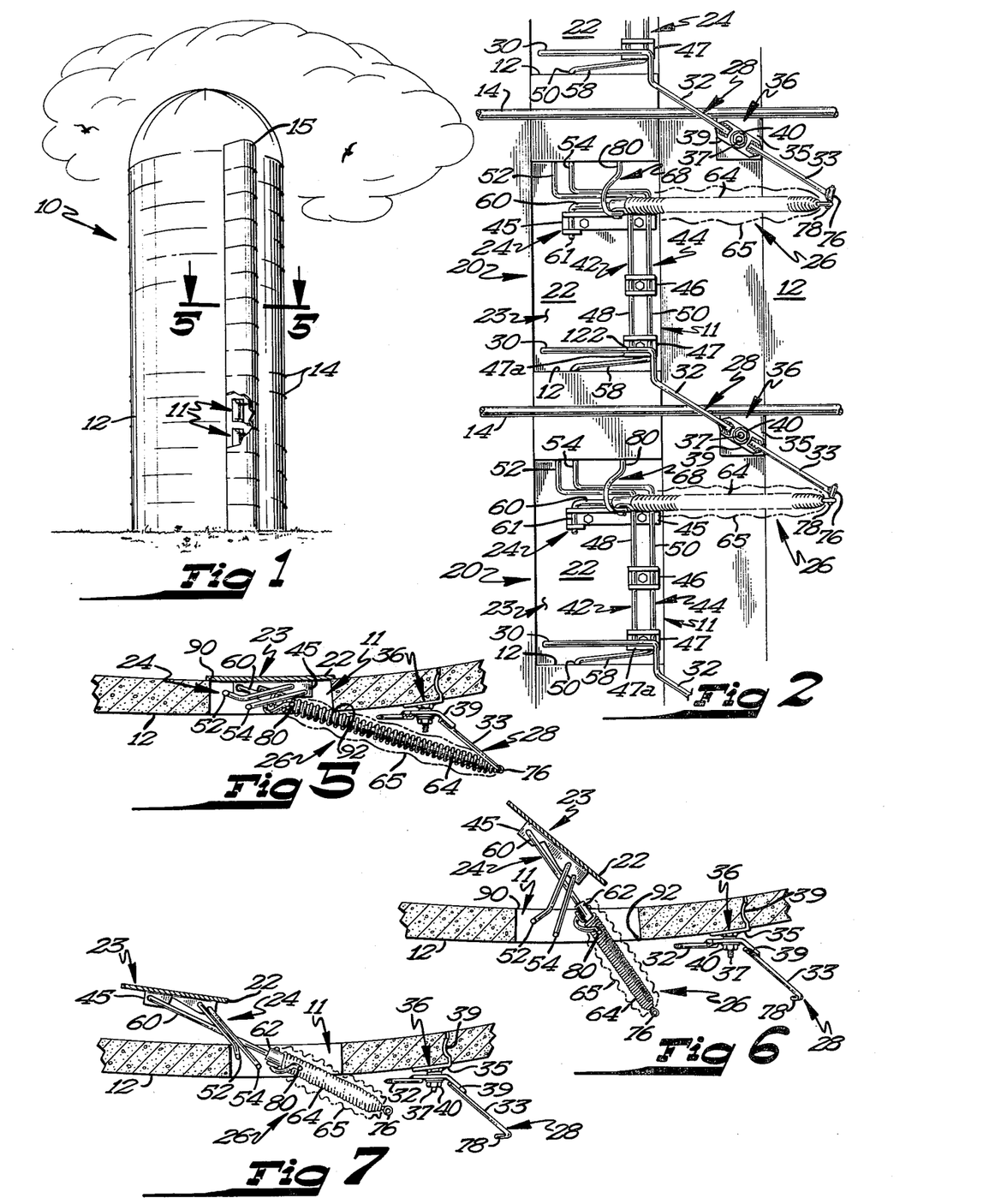
FIG. 1 is a perspective view of a silo equipped with a plurality of silo doors constructed in accordance with the teachings of this invention, and with parts thereof broken away for clarity.
FIG. 2 is an enlarged, elevational view showing a pair of adjacent silo door systems.
FIG. 5 is a sectional view taken generally through line 5—5 in FIG. 1, with a silo door shown in a closed position.
FIG. 6 is a sectional view similar to FIG. 5 showing the door in an intermediate open position.
FIG. 7 is a sectional view similar to FIGS. 5 and 6 showing the door in a fully open position.

As best seen in FIG. 2, each silo door apparatus 20 comprises a door slab member 22 which is adapted to selectively block or close the associated silage discharge orifice 11 over which the door is mounted. In FIG. 2 the doors are indicated in a closed position, where slab 22 abuts and seals the silage discharge orifice and prevents the inadvertent discharge of silage therethrough. Each door slab is preferably mounted by a hinge assembly 24 which enables it to be pivoted or revolved away in a controlled movement or attitude from the silo discharge orifice toward the silo interior. The door is actuated by a gun assembly 26 which will thrust the door into the open position when released by a trigger assembly 28. The trigger apparatus is responsive to the level of silage within the silo.

Figures 3, 4, 11:
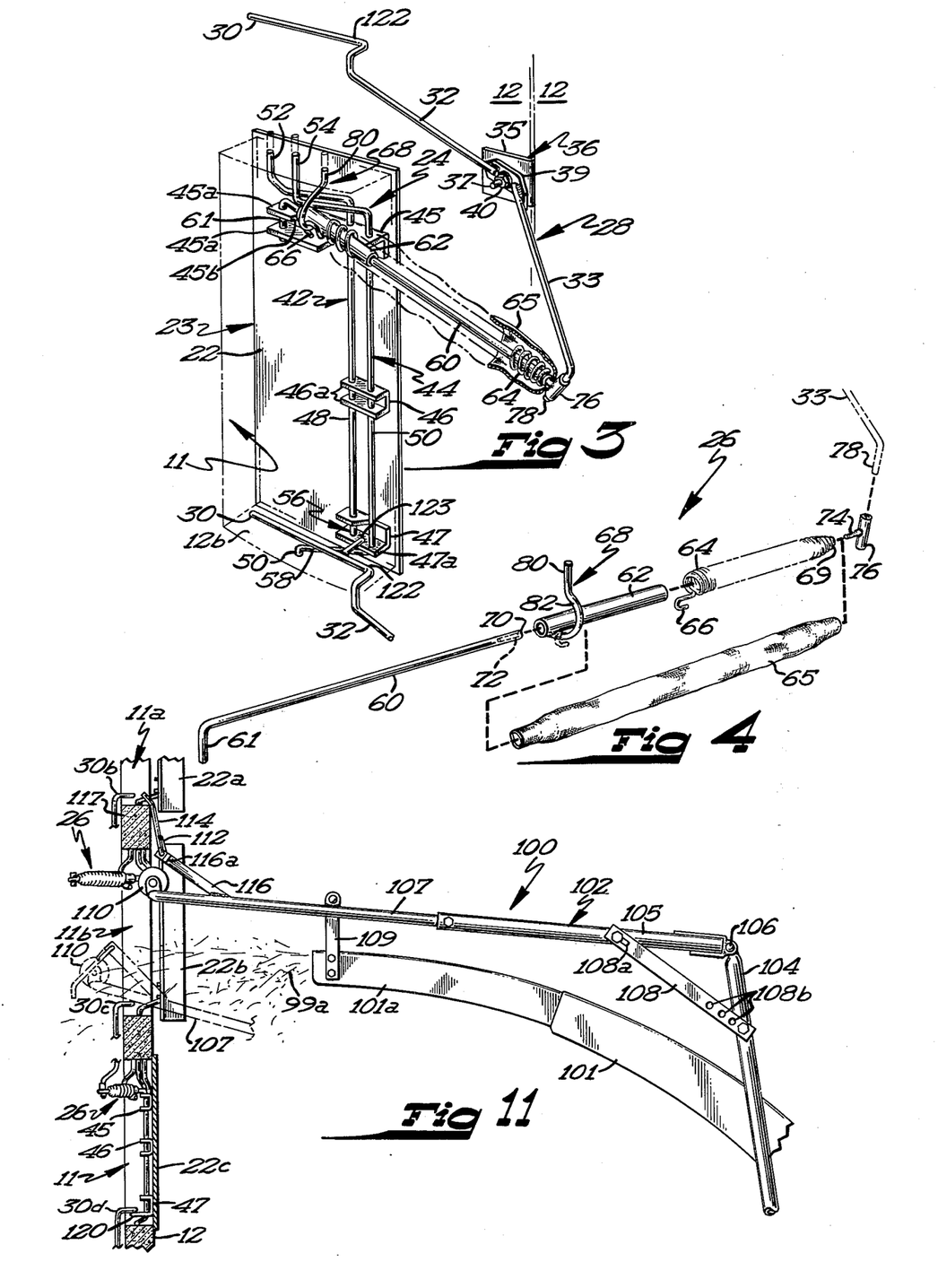
FIG. 3 is a perspective view of a silo door assembly constructed in accordance with the teachings of this invention; with parts thereof broken away or shown in section for clarity.
FIG. 4 is an enlarged, exploded perspective view of the gun assembly utilized to open the door.
FIG. 11 is a view similar to FIGS. 9 and 10 showing the unloader torque arm fully withdrawn from an upper silo door orifice and dropped into a lower silo orifice, thereby contacting a lower silo door trigger to actuate same.
Figures 8, 9, 10:
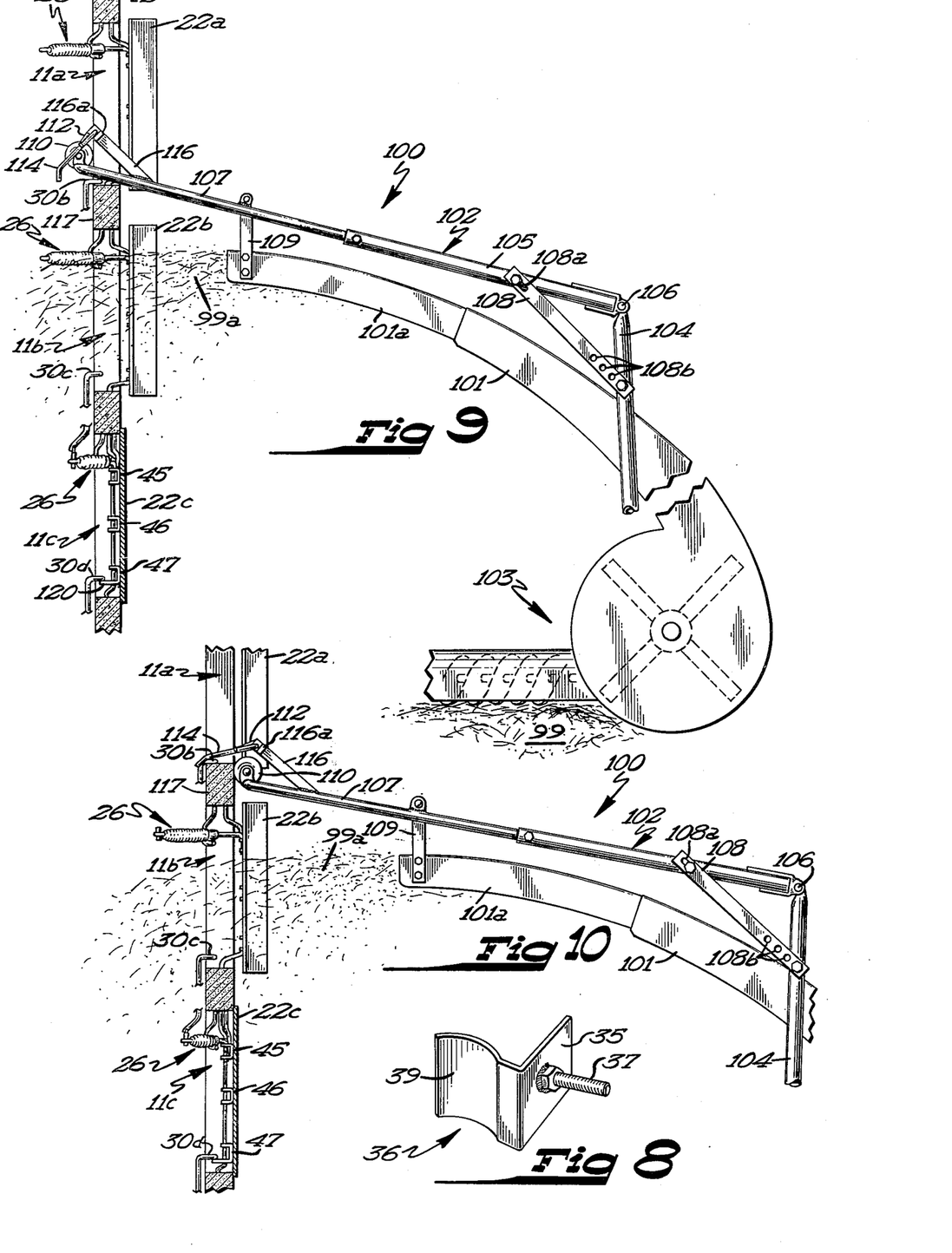
FIG. 8 is a perspective view of a bracket for pivotally mounting the trigger arm assembly to the silo.
FIG. 9 is a view from the inside of the silo showing the torque arm and output chute portion of a silo unloader adapted to open doors by selectively, sequentially contacting the trigger means.
FIG. 10 is a view similar to FIG. 9 showing the silo unloader torque arm in a position immediately prior to withdrawing from an upper silo orifice.

Each trigger assembly 28 includes an upper bent portion 30 adapted to be received within an upper, adjacent silo door orifice, a main body portion 32 pivotally mounted to silo 10, and an integral lower portion 33 thereof which is releasably coupled to the gun assembly 26. Each trigger is preferably pivotally coupled to the silo 10 by attachment to a bracket 36 which includes a flat body portion 35 flushly abutting the silo wall and an outwardly extending, threaded pivot point 37 adapted to receive a flattened trigger body portion 39. A conventional bolt 40 attaches the trigger to the bracket. As best seen in FIG. 8, bracket 36 also comprises an integral curved portion 39 adapted to be wedged between the tongue and groove portions of adjacent, conventional silo staves 12 (FIG. 3). In this manner the bracket 36 can be conveniently installed during the erection of a silo without the necessity of drilling or the like.

Door hinge means 24 preferably comprises first and second hinge bars 42 and 44 (FIGS. 2 and 3) which are pivotally coupled to the door slab member 22. To this effect each door slab is provided with a plurality of hinge plates 45 through 47 which are in the form of generally U-shaped channels, having vertical portions thereof abutting door 22 and horizontal portions apertures to pivotally receive the hinge bars. Each hinge includes an elongated, generally vertically oriented portion 48 or 50 respectively which is rotatably coupled to door slab 22 through the hinge plates 45 through 47. Reinforcement hinge 46 provides additional support to sealably maintain the door against the discharge orifice. Each hinge member 42 and 44 includes an upper, integral offset portion 52 and 54 respectively, which is anchored within the concrete silo to pivotally mount the door. The lower end 58 of hinge member 42 is pivotally secured through bracket 47, while hinge 44 comprises an offset segment 58 (similar to upper segments 52 and 54) which is anchored within the lower silo slab 12b. Through the inclusion of the offset mounting sections 54, 52 and 58, the door slab will be rotatably mounted with respect to the orifice 11 which it selectively blocks. Since both hinge segments 48 and 50 are maintained in relative position by hinges 47 and 45, the door slab 22 will be rotated out of and away from the orifice 11, in a direction toward the interior of the silo. The door slab is actuated in response to triggering of the gun means 26.

Gun means 26 (FIGS. 2-4) preferably comprises a first elongated member 60 in the form of a rigid rod and a second elongated member 62 which is preferably in the form of a tubular sleeve. Rod 60 is coaxially received by sleeve 62, and is axially movable with respect thereto. Gun rod 60 includes a downwardly (as viewed in FIG. 2) bent portion 61 thereof which is pivotally coupled to door slab 22 through orifices provided in the horizontal segments 45a of hinge member 45. An elongated, coiled spring member 64 coaxially surrounds and selectively displaces rod 60 outwardly with respect to sleeve 62. A fluted, exterior shield 65 is preferably wrapped around spring 64 to prevent dust or other material from contaminating the apparatus. The spring 64 includes a forward hook portion 66 thereof which grasps an offset sleeve hinge member 68 which is attached to sleeve 62 at a forward end thereof. The rear 69 of spring 64 is of generally tapered profile, and will thus abut an end 70 of rod 60 to normally urge the rod axially outwardly with respect to the sleeve 62. Rod end 70 preferably includes a tapped orifice 72 which receives a threaded shank portion 74 of a generally tubular release member 76. Release 76 selectively receives a trigger pin 78. When the door is closed and the gun 26 is in a retracted position, trigger pin 78 will maintain the gun in a retracted position against predetermined pressure from the spring 64. In response to actuation of the trigger, trigger portion 33 will pivot upwardly pulling pin 78 out of sleeve 76 to release rod 60, which will then be thrust forward and out of sleeve 62 by spring 64. As best viewed in FIG. 2, pivoting of the trigger 28 is accomplished by depressing the trigger actuation segment 30 downwardly (as viewed in FIG. 2) thereby pivoting end 33 thereof upwardly with respect to pivot point 40 to release the gun by pulling pin 78 from sleeve 76. As will be discussed in more detail later, trigger segment 30 is preferably positioned within the upper adjacent silo orifice, so that it may be contacted by silo unloader chute apparatus during unloading of the silo (FIGS. 9-10).

The sleeve hinge member 68 (FIG. 4) comprises a generally vertically upwardly extending portion 80 thereof which is oriented generally perpendicular to sleeve 62, and an integral, generally C-shaped, curved offset portion 82 thereof which is attached at the forward end of sleeve 62 as by welding or the like. Hinge segment 80 is rotatably anchored within an upper door header orifice to securely anchor the sleeve 62 with respect to the silo. Since sleeve 62 cannot move axially, gun rod 60 is forced to move outwardly with respect to sleeve 62, thereby automatically opening the door. As will become quite clear from the following discussion of FIGS. 5 through 7, the curved segment 82 of sleeve hinge member 68 pivots the gun assembly in order to provide a wedging action to close the door against predetermined spring pressure.

In FIG. 5 the door slab 22 is illustrated in a closed position abutting orifice 11 interiorly of the silo 10. Since the trigger assembly 26 is coupled to the gun when the gun is retracted, the trigger will releasably maintain the door in the illustrated closed position. When the trigger is activated it will release the gun which will expand in length to force door 22 open. In response to rod 60 the door will be pivoted outwardly of the orifice 11 by hinge bars 42 and 44 (FIG. 2), which will preserve the inwardly directed orientation of door slab surface 23 as the door moves to an open position (FIG. 6). It will be appreciated that, once released, the gun is mechanically secured to the silo only by rod end portion 61 and sleeve hinge 68.

In FIG. 7 the door is shown fully opened, and gun 26 is fully extended. In this position the door will have been moved out of and away from the silage discharge orifice 11 to prevent contact with the silo unloader discharge chute. It will also be seen that gun rod 60 is almost abutting interior corner 90 of the silo discharge orifice. Furthermore, when the gun is in a retracted position as illustrated in FIG. 5, it will be apparent that an opposite corner 92 of the silo abuts the gun and pivots it in such a fashion as to wedge the door 22 into engagement with the silage discharge orifice 11, thereby maintaining the door in a closed position as long as the trigger is securely coupled to the gun. Sleeve hinge member 68 must be positioned so that the gun will wedge against corner 92 when in the retracted (door closed) position, while enabling the gun rod 60 to clear the opposite inner corner 90 when the door is in a fully opened position (FIG. 7).

Referring now to FIGS. 9 through 11 there is shown a silage discharge chute assembly which is described in more detail in my co-pending application entitled Torque Arm Assembly, filed Oct. 26, 1976, Ser. No. 735,696, owned by the same assignee as in the instant case, which is hereby incorporated by reference. While a particular form of silo unloader discharge chute is illustrated and described for convenience, it should be understood that any conventional silo unloader having a discharge chute portion thereof positioned adjacent the silage discharge orifices will adequately trigger the previously described automatic silo door apparatus.

In FIG. 9 a silo unloader discharge chute assembly 100 comprises a chute 101 and a torque arm assembly 102 which sequentially enters the discharge orifices to appropriately position the chute. Apparatus 100 is associated with an unloader 103 removing silage 99, which decreases the level during unloading. Silage 99a is ejected through the orifices by the silo unloader. The torque arm assembly includes a vertical portion 104 which is pivotally coupled to a first horizontal sleeve member 105 with a joint 106 and an accommodating cross brace member 108. Sleeve member 105 receives an axially slidable rod portion 107, which supports lower chute portion 101a through bearing bracket 109. Torque arm rod 107 includes a traveller wheel 110 over which an angled release latch 112 is positioned. Latch 112 includes a downwardly angled fork member 114 which is pivotally connected to an inclined portion 116 integral with rod 107. In FIG. 9 it will be observed that during unloading of silage through an orifice 11b, door apparatus 22a and 22b will be open and the torque rod 107 will be received within the upper orifice 11a. At this time the adjacent lower door 22c will be in a closed position, thereby blocking the lower silage discharge orifice 11c.

Operation of each door 22a through 22c is initiated by an appropriate trigger, as described earlier in conjunction with FIGS. 1 through 8. Thus, door 22b, for example, will be opened by actuation of a trigger portion 30b disposed within orifice 11a, and lower door 22c will be actuated in response to movement or deflection of its associated trigger portion 30c, disposed within orifice 11b. In like manner an array of doors may be sequentially opened during unloading, as each door will preferably include an initiating trigger assembly disposed immediately above it which will be mechanically contacted by the silo unloader.

As silage 99 is continuously discharged during the unloading operation, the silage level within the silo will of course decrease. The silo unloader 103 will thus recede to a lower position. When the chute is no longer in a position to discharge silage 99 through the orifice 11b, the torque arm will automatically withdraw from upper orifice 11a and reposition itself in orifice 11b, thereby contacting trigger 30c and opening lower door 22c to enable repositioned chute 101 to discharge silage through orifice 11c.

Thus in FIG. 10 the gradually lowering discharge chute assembly 100 has drawn arm 107 partially out of orifice 11a. At this time roller wheel 110 will be contacting the partition 117 between the adjacent discharge orifices 11a and 11b. Fork 114 will be abutting the side of orifice 11a to maintain the orderly withdrawal of rod 107. As rod 107 is withdrawn from orifice 11a, it will be coaxially telescopingly received within sleeve member 105. As the silage level within the silo continuously decreases, rod 107 will withdraw completely from orifice 11a until wheel member 110 thereof is positioned immediately below partition 117. At this time the latch member 114 will withdraw from orifice 11a and orient itself substantially axially with respect to inclined portion 116. When the latter occurs, arm 102 will be ready to drop to a lower position within orifice 11b, and accordingly the trigger portion 30c will be contacted by rod portion 107 (shown in dotted lines in FIG. 11) to sequentially open the lower door 22c. Of course it will be understood that as silage is discharged through the various orifices it will be contained within the silo discharge chute 15 (FIG. 1) at the outside of the silo.

Thus, during automatic unloading of the silo, the output chute portion of the silo unloader will be utilized to sequentially operate the various orifice doors. Of course various other means may be employed to actuate the door trigger assemblies. In other words, sequential opening of the doors will be automatically accomplished as the silage level recedes. When the silo unloader recedes into a position to discharge silage through a lower discharge opening, the chute apparatus will have already triggered the next lower door to facilitate ejection of silage therethrough.

Since the farmer must often climb into the silo chute to inspect or work on same, it has been found desirable to provide a safety feature whereby the doors may not be inadvertently activated. An inwardly (as viewed in FIG. 3) extending trigger portion 123 is positioned over hinge member 47a. When positioned as illustrated the trigger cannot be depressed to actuate the next lower door because it securely abuts the hinge 47a unless the door 22 (FIG. 3) is previously opened. With silos constructed in this fashion it will be appreciated that the doors can only be opened sequentially, starting from the top and working vertically downwardly toward the bottom. While this facilitates silage unloading in an automatic fashion as previously described, it will be apparent that inadvertent opening of single doors is thus prevented. Thus, where a farmer accidently drops a tool or steps on a portion of the hinge apparatus, he cannot force a trigger member to actuate one of the silo doors because trigger travel is limited by a portion of the next upper door. Of course, it will be appreciated by those skilled in the art that trigger portion 122 could be located in abutting relationship with respect to other illustrated door parts to effectuate the same safety features.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. Silo door apparatus adapted to be mounted on a silo, said silo comprising at least one silage discharge orifice, said door apparatus comprising:
    a door member for selectively blocking a first predefined silo door orifice;
    door hinge means for revolvably mounting said door member to said silo whereby said door may be moved between closed and open positions;
    retractable gun means for selectively opening said door member, said gun means comprising:
        a first rigid elongated member;
        a second rigid elongated member coupled to said first elongated member and axially movable with respect thereto;
    means coupling one of said first and second elongated members to said door member; and
    means for biasing one of said first and second elongated members outwardly with respect to the other of said first and second elongated members, thereby urging said door member toward an open position; and
    trigger means for selectively activating said gun means when desired to open said door member; and
    gun hinge means for revolvably securing said gun means to said silo, said gun hinge means facilitating pivoting of said gun means against a portion of said silo in response to retraction of said gun means whereby said door member is wedged into a closed position firmly abutting said silo door orifice.

2. The combination as defined in claim 1 wherein said door hinge means comprises first and second spaced apart door hinge bars, each of said door hinge bars comprising elongated portions thereof rotatably coupled to said door member and integral offset portions thereof revolvably anchored to said silo, facilitating revolving of said door member out of and away from said silo door orifice in response to said gun means.

3. Silo door apparatus adapted to be mounted on a silo, said silo comprising at least one silage discharge orifice, said door apparatus comprising:
    a door member for selectively blocking a first predefined silo door orifice;
    door hinge means for revolvably mounting said door member to said silo whereby said door may be moved between closed and open positions;
    retractable gun means for selectively opening said door member, said gun means comprising:
        a first rigid elongated member;
        a second rigid elongated member coupled to said first elongated member and axially movable with respect thereto;
    means coupling one of said first and second elongated members to said door member; and
    means for biasing one of said first and second elongated members outwardly with respect to the other of said first and second elongated members, thereby urging said door member toward an open position; and
    movable trigger means for selectively activating said gun means when it is desired to open said door member, said trigger means comprising a first end portion thereof releasably coupled to said gun means for actuating said gun means and a second end portion responsive to mechanical deflection for releasing said first trigger end portion.

4. The combination as defined in claim 3 wherein said trigger means is pivotally mounted to said silo and said second end portion is adapted to be disposed within a predefined adjacent silo door orifice located above said first predetermined silo orifice, whereby the trigger means second end portion may be contacted by conventional unloader apparatus disposed within said silo to thereby automatically open said door member.

5. The combination as defined in claim 3 wherein said gun means first elongated member comprises a tubular sleeve, said gun means second elongated member comprises a rod coaxially received by said tubular sleeve, and said biasing means comprises a spring.

6. The combination as defined in claim 5 wherein said spring coaxially surrounds said sleeve and said rod, said spring fastened at a first end thereof to said sleeve and said spring including a second end thereof urging said rod toward an axially outwardly extended position with respect to said sleeve.

7. The combination as defined in claim 6 wherein said gun means rod has a first end mechanically coupled to said door member and a second end thereof releasably secured to said trigger means.

8. The combination as defined in claim 7 wherein said apparatus comprises gun hinge means for revolvably securing said gun means to said silo, said gun hinge means facilitating pivoting of said gun means against a portion of said silo in response to retraction of said gun means whereby said door member is wedged into a closed position firmly abutting said silo door orifice.

9. The combination as defined in claim 5 wherein said trigger means second end portion is adapted to be disposed within a predefined adjacent silo door orifice located above said first predetermined silo orifice, whereby the trigger means second end portion may be contacted by unloader apparatus disposed within said silo to thereby automatically open said door member.

10. The combination as defined in claim 9 wherein said gun means rod has a portion thereof pivotally coupled to said door member and an opposite end thereof releasably secured to said trigger means.

11. The combination as defined in claim 9 wherein said door hinge means comprises first and second spaced apart door hinge bars, each of said door hinge bars comprising elongated portions thereof rotatably coupled to said door member and integral offset portions thereof revolvably anchored to said silo, facilitating revolving of said door member out of and away from said silo door orifice in response to said gun means.

12. The combination as defined in claim 9 wherein said apparatus comprises gun hinge means for revolvably securing said gun means to said silo, said gun hinge means facilitating pivoting of said gun means against a portion of said silo in response to retraction of said gun means whereby said door member is wedged into a closed position firmly abutting said silo door orifice.

13. Silo door apparatus for attachment to a silo provided with a plurality of predefined vertically spaced apart silo door orifices, said apparatus comprising:
   a door member for selectively blocking a first predetermined silo door orifice;
   door hinge means for revolvably mounting said door member to said silo whereby said door may be moved between closed and open positions;
   gun means for selectively opening and closing said door member; and
   trigger means for automatically activating said gun means to open said door in response to a predetermined silage level within said silo.

14. The combination as defined in claim 13 wherein said apparatus comprises gun hinge means for revolvably securing said gun means to said silo, said gun hinge means facilitating pivoting of said gun means against a portion of said silo in response to retraction of said gun means whereby said door member is wedged into a closed position firmly abutting said silo door orifice.

15. The combination as defined in claim 13 wherein said trigger means is pivotally mounted to said silo and comprises a first portion thereof mechanically coupled to said gun means for actuating said gun means and a second end portion thereof responsive to mechanical contact to activate said first trigger end portion.

16. The combination as defined in claim 15 wherein said trigger means second end portion is adapted to be disposed within a second predetermined adjacent, silo door orifice located above said first predetermined silo orifice, whereby the trigger means second end portion may be contacted by silo unloader apparatus disposed within said silo to thereby automatically open said door member.

17. The combination as defined in claim 16 wherein said door hinge means comprises first and second spaced apart door hinge bars, each of said hinge bars comprising elongated portions thereof rotatably coupled to said door member and integral offset portions thereof revolvably anchored to said silo, facilitating revolving of said door member out of and away from said silo door orifice in response to said gun means.

18. The combination as defined in claim 17 wherein said gun means comprises:
   a first rigid elongated member;
   a second rigid elongated member coupled to said first elongated member and axially movable with respect thereto;
   means coupling one of said first and second elongated members to said door member; and
   means for biasing one of said first and second elongated members outwardly with respect to the other of said first and second elongated members, thereby urging said door toward an open position.

19. The combination as defined in claim 18 wherein said gun means first elongated member comprises a tubular sleeve, said gun means second elongated member comprises a rod coaxially received by said tubular sleeve, said biasing means comprises a spring coaxially surrounding said sleeve and said rod, said spring being fastened at a first end thereof to said sleeve and said spring including a second end thereof engaging said rod, whereby said spring urges said rod toward an axially outwardly extended position with respect to said sleeve.

20. The combination as defined in claim 19 wherein said gun means rod has a first end mechanically coupled to said door member and a second end thereof releasably secured to said trigger means.

21. The combination as defined in claim 20 wherein said apparatus comprises gun hinge means for revolvably securing said gun means to said silo, said gun hinge means facilitating pivoting of said gun means against a portion of said silo in response to retraction of said gun means whereby said door member is wedged into a closed position firmly abutting said silo door orifice.

22. In an upright vertical silo comprising a plurality of predefined vertically spaced apart silo door orifices, and a plurality of door members selectively receivable within said orifices, the improvement comprising an automatic silo door opening system, said system comprising:
   door hinge means for revolvably mounting at least one of said door members to said silo whereby said door may be moved between open and closed positions;
   retractable gun means for selectively opening said doors, said gun means comprising:
   a first rigid, elongated member;
   a second rigid elongated member coupled to said first elongated member and axially movable with respect thereto;
   means coupling one of said first and second elongated members to said door member; and
   means for biasing one of said first and second elongated members outwardly with respect to the other of said first and second members, thereby urging said door toward an open position; and
   trigger means for selectively activating said gun means when desired to open said door; and
   gun hinge means for revolvably securing said gun means to said silo, said gun hinge means facilitating pivoting of said gun means against a portion of said silo in response to retraction of said gun means whereby said door member is wedged into a closed position firmly abutting said silo door orifice.

23. The improvement as defined in claim 22 wherein said door hinge means comprises first and second spaced apart door hinge bars, each of said door hinge bars comprising elongated portions thereof rotatably coupled to said door and integral offset portions thereof revolvably anchored to said silo, facilitating revolving of said door member out of and away from said silo door orifice in response to said gun means.

24. In an upright vertical silo comprising a plurality of predefined vertically spaced apart silo door orifices, and a plurality of door members selectively receivable within said orifices, the improvement comprising an automatic silo door opening system, said system comprising:
   door hinge means for revolvably mounting at least one of said door members to said silo whereby said door may be moved between open and closed positions;
   retractable gun means for selectively opening said doors said gun means comprising:
   a first rigid, elongated member;
   a second rigid elongated member coupled to said first elongated member and axially movable with respect thereto;

means coupling one of said first and second elongated members to said door member; and means for biasing one of said first and second elongated members outwardly with respect to the other of said first and second members, thereby urging said door toward an open position; and trigger means pivotally mounted to said silo for selectively activating said gun means when it is desired to open said door, said trigger means comprising a first end portion releasably coupled to said gun means for actuating said gun means and a second end portion responsive to mechanical deflection to actuate said gun means by releasing said first trigger end portion.

25. The improvement as defined in claim 24 wherein said trigger means second end portion is disposed within an upper silo orifice located above said predetermined silo orifice, whereby the trigger means second end portion may be contacted by unloader apparatus disposed within said silo to thereby automatically open said door member.

26. The improvement as defined in claim 25 wherein said trigger means second end portion is positioned in abutting relationship with respect to a portion of an adjacent upper silo door, thereby preventing actuation of said silo door until after said upper silo door is opened.

27. The improvement as defined in claim 24 wherein said gun means first elongated member comprises a tubular sleeve, said gun means second elongated member comprises a rod coaxially, telescopingly received by said tubular sleeve, said biasing means comprises a spring coaxially surrounding said sleeve and said rod, said spring being fastened at a first end thereof to said sleeve and said spring including a second end thereof engaging said rod, whereby said spring urges said rod toward an axially outwardly extended position with respect to said sleeve.

28. The improvement as defined in claim 27 wherein said gun means rod has a first end mechanically coupled to said door member and a second end thereof releasably secured to said trigger means.

29. The improvement as defined in claim 27 wherein said apparatus comprises gun hinge means for revolvably securing said gun means to said silo, said gun hinge means facilitating pivoting of said gun means against a portion of said silo in response to retraction of said gun means whereby said door member is wedged into a closed position firmly abutting said silo door orifice.

30. The improvement as defined in claim 27 wherein said trigger means is pivotally mounted to said silo and said trigger comprises a first end portion thereof releasably coupled to said gun means for actuating said gun means and a second end portion responsive to mechanical deflection to initiate said gun means by releasing said first trigger end portion.

31. The improvement as defined in claim 30 wherein said gun means rod has a first end mechanically coupled to said door member and a second end thereof releasably secured to said trigger means.

32. The improvement as defined in claim 31 wherein said gun means first elongated member comprises a tubular sleeve, said gun means second elongated member comprises a rod coaxially, telescopingly received by said tubular sleeve, said biasing means comprises a spring coaxially surrounding said sleeve and said rod, said spring being fastened at a first end thereof to said sleeve and said spring including a second end thereof engaging said rod, whereby said spring urges said rod toward an axially outwardly extended position with respect to said sleeve.

33. The improvement as defined in claim 32 wherein said apparatus comprises gun hinge means for revolvably securing said gun means to said silo, said gun hinge means facilitating pivoting of said gun means against a portion of said silo in response to retraction of said gun means whereby said door member is wedged into a closed position firmly abutting said silo door orifice.

34. In an upright vertical silo having a plurality of predefined silo door orifices, the improvement comprising automatically openable door apparatus operably associated with said silo, said door apparatus comprising:

at least one door member for selectively blocking a first predetermined silo door orifice;

door hinge means for revolvably mounting said door member to said silo whereby said door member may be moved between closed and open positions;

gun means for selectively opening said door member; and trigger means for automatically activating said gun means to open said door in response to a predetermined silage level within said silo.

35. The improvement as defined in claim 34 wherein said apparatus comprises gun hinge means for revolvably securing said gun means to said silo, said gun hinge means facilitating pivoting of said gun means against a portion of said silo in response to retraction of said gun means whereby said door member is wedged into a closed position firmly abutting said silo door orifice.

36. The improvement as defined in claim 34 wherein said trigger means is pivotally mounted to said silo and comprises a first portion thereof mechanically coupled to said gun means for actuating said gun means and a second end portion thereof responsive to mechanical contact to actuate said first trigger end portion.

37. The improvement as defined in claim 36 wherein said trigger means second end portion is disposed within a second predefined adjacent, silo door orifice located above said first predetermined silo orifice, whereby the trigger means second end portion may be contacted by silo unloader apparatus disposed within said silo to thereby automatically open said door member.

38. The improvement as defined in claim 37 wherein said door hinge means comprises first and second spaced apart door hinge bars, each of said hinge bars comprising elongated portions thereof rotatably coupled to said door member and integral offset portions thereof revolvably anchored to said silo, facilitating revolving of said door member out of and away from said silo door orifice in response to said gun means.

39. The improvement as defined in claim 38 wherein said gun means comprises:

a first rigid elongated member;

a second rigid elongated member coupled to said first elongated member and axially movable with respect thereto;

means coupling one of said first and second elongated members to said door member; and means for biasing one of said first and second elongated members outwardly with respect to the other of said first and second elongated members, thereby urging said door toward an open position.

40. The improvement as defined in claim 39 wherein said gun means first elongated member comprises a tubular sleeve, said gun means second elongated member comprises a rod coaxially received by said tubular sleeve, said biasing means comprises a spring coaxially surrounding said sleeve and said rod, said spring being fastened at a first end thereof to said sleeve and said spring including a second end thereof engaging said rod, whereby said spring urges said rod toward an axially outwardly extended position with respect to said sleeve.

41. The improvement as defined in claim 39 wherein said trigger means second end portion is positioned in abutting relationship with respect to a portion of an upper adjacent silo door, thereby preventing actuation of said silo door until after said upper silo door is opened.

* * * * *